March 30, 1926.
E. B. MYERS
HOOK FORMING DEVICE FOR ELECTRODE SUPPORTS
Original Filed Sept. 28, 1921
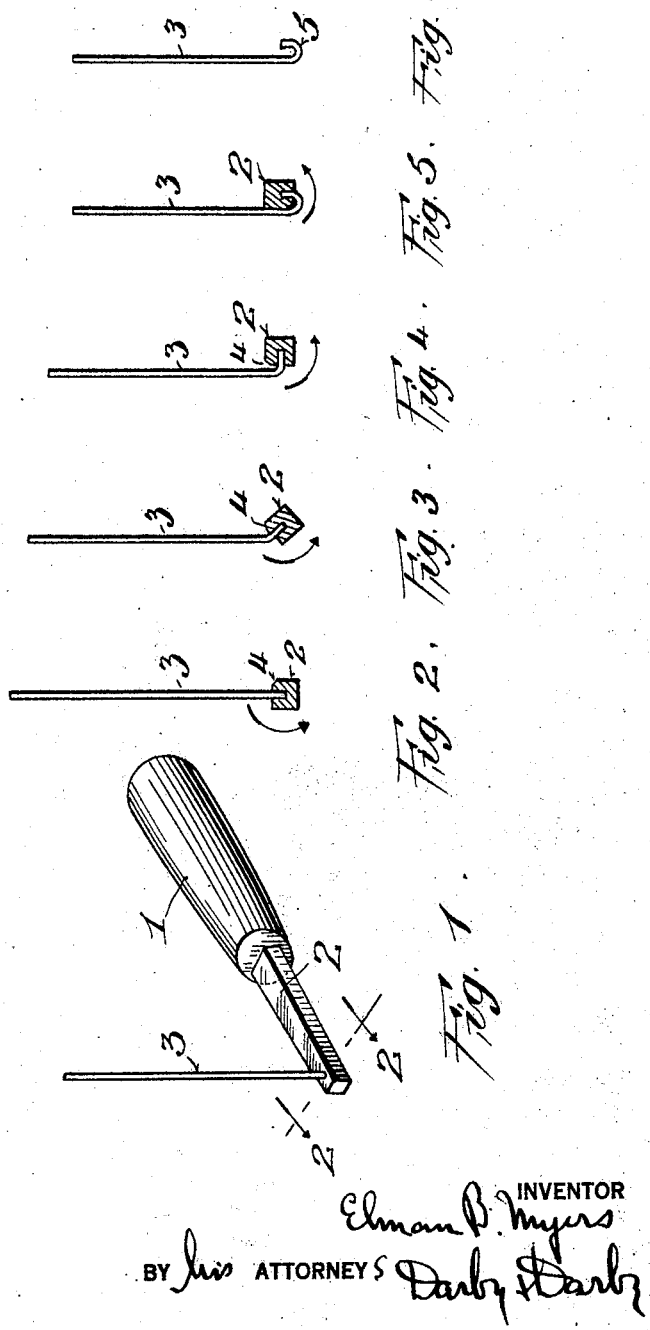

Patented Mar. 30, 1926.

1,578,462

UNITED STATES PATENT OFFICE.

ELMAN B. MYERS, OF WAYNE, PENNSYLVANIA, ASSIGNOR TO RADIO AUDION COMPANY, OF JERSEY CITY, NEW JERSEY, A CORPORATION OF DELAWARE.

HOOK-FORMING DEVICE FOR ELECTRODE SUPPORTS.

Application filed September 28, 1921, Serial No. 503,820. Renewed January 23, 1926.

*To all whom it may concern:*

Be it known that I, ELMAN B. MYERS, a citizen of the United States, residing at 125 Lancaster Ave., W., Wayne, county of Delaware, and State of Pennsylvania, have made a certain new and useful Invention in Hook-Forming Devices for Electrode Supports, of which the following is a specification.

This invention relates to hook forming devices, particularly to such devices as are employed in forming hooks or clinching members in electrode supports particularly for use in connection with thermionic tubes such as audions, rectifiers, etc.

The object of the invention is to provide a hook forming device which is simple in structure, economical of manufacture, exceedingly simple and efficient in use, and wherein an electrode supporting or clinching hook is formed in the electrode support with uniformity of pitch and shape.

Further objects of the invention will appear more fully hereinafter.

The invention consists substantially in the construction, combination, location, and relative arrangement of parts, all as will be more fully herinafter set forth, as shown in the accompanying drawing, and finally pointed out in the appended claims.

Referring to the accompanying drawing,—

Figure 1 is a view in perspective showing a hook forming device of my invention as initially applied to the bend of the member to which the hook is to be imparted.

Fig. 2 is a sectional view taken on the line 2, 2, Fig. 1, looking in the direction of the arrows.

Figs. 3, 4, and 5 show the various positions of the hook forming device relative to the electrode supporting member.

Fig. 6 shows an electrode member with the hook formed thereon in accordance with my invention.

The same part is designated by the same reference character wherever it occurs throughout the several views.

While I have shown and will now describe a hook forming device especially adapted to form hooks in electrode supporting members, I wish it to be understood that I do not desire to be limited or restricted thereto as my invention may be equally well used to form hooks of uniform pitch in metallic members wherever it is so desired and in whatever art it is so desired. Referring to the drawing however, the hook forming device of my invention consists essentially of a handle 1, provided with the tool 2, having therein an opening of exact contour with the member 3 to be bent. The hole does not extend completely through the tool 2 in the form shown, but as will be apparent it may extend completely through the tool or it may extend as deeply into the tool 2 as desired or in accordance with the shape of the hook desired and the position in the length of the member to which the hook is applied. In the form shown however, the hole in the tool 2 extends substantially halfway through the tool 2, and the member 3 is inserted therein as above explained. The member 3 is then held in the original position by any suitable means, and the tool 2 has imparted thereto a twist or rotation whereby the member 3 is bent at its point of protrusion from the tool 2. The tool 2 is preferably provided with a beveled edge 4 at its point of contact with the member 3. The tool 2 is twisted into the position shown in Fig. 5 and withdrawn from engagement with the member 3, leaving the hook 5 formed therein.

It will be apparent that with the tool of my invention hooks of uniform shape can be made, and that therefore the tool of my invention is especially applicable for electrical apparatus where uniformity is desirable.

Many modifications and changes in details will readily occur to those skilled in the art without departing from the spirit and scope of my invention as defined in the claims. Therefore what I claim as new and useful and of my own invention and desire to secure by Letters Patent is,—

1. A hook forming tool for electrode supports comprising a shank and a handle thereon to manipulate said shank, said shank being formed with an orifice therein at right angles to the long axis of the shank and of the size of the electrode support, and provided with a side surface adapted to bear against the electrode support to determine the amount of curvature imparted thereto in forming the hook, and one edge of the shank being beveled at the edge thereof first adjacent the curved portion of the electrode support.

2. A hook forming tool for electrode supports comprising a shank having a handle on one end and formed with an orifice therein near the other end, said orifice being of the size of the electrode support and of a depth determined by the size of the hook to be formed by twisting said tool, thereby causing the side surface of said shank to bear against the electrode support to limit the amount of curvature imparted thereto in forming the hook.

In testimony whereof I have hereunto set my hand on this 27th day of September A. D., 1921.

ELMAN B. MYERS.